United States Patent

Ribeca

[11] 4,054,375
[45] Oct. 18, 1977

[54] REAR VIEW CYCLING MIRROR

[76] Inventor: Carl Ribeca, 443 Ashland Ave., Chicago Heights, Ill. 60411

[21] Appl. No.: 741,561

[22] Filed: Nov. 15, 1976

Related U.S. Application Data

[63] Continuation-in-part of Ser. No. 677,699, April 15, 1976, abandoned.

[51] Int. Cl.² ............................................. G02B 5/08
[52] U.S. Cl. ............................... 350/307; 350/298
[58] Field of Search ............ 350/98, 288, 298, 306, 350/307; 248/466, 476, 479, 481–484; 132/83 R, 83 E, 83 F; 280/289 R, 289 H

[56] References Cited

U.S. PATENT DOCUMENTS

| 1,982,248 | 11/1934 | Gebhardt | 132/83 R |
| 2,758,508 | 8/1956 | Petri et al. | 350/307 |
| 3,717,403 | 2/1973 | Messier | 350/298 |
| 3,995,945 | 10/1975 | Addicks | 350/307 |

FOREIGN PATENT DOCUMENTS

| 585,974 | 12/1924 | France | 350/298 |
| 805,741 | 8/1936 | France | 132/83 F |
| 345,766 | 4/1931 | United Kingdom | 350/298 |

*Primary Examiner*—F. L. Evans
*Attorney, Agent, or Firm*—Hosier, Niro & Daleiden, Ltd.

[57] ABSTRACT

A rear view cycling mirror is disclosed comprising a case housing a mirror adapted to be strapped to the wrist of a cyclist or attached via a clip to the bicycle. The mirror is mounted on the inside face of the case cover which is hinged to the base of the case by a universal ball joint. This joint provides maximum adjustability to the cyclist. The strap or clip is inserted through a slot in a dropped portion of the base.

7 Claims, 8 Drawing Figures

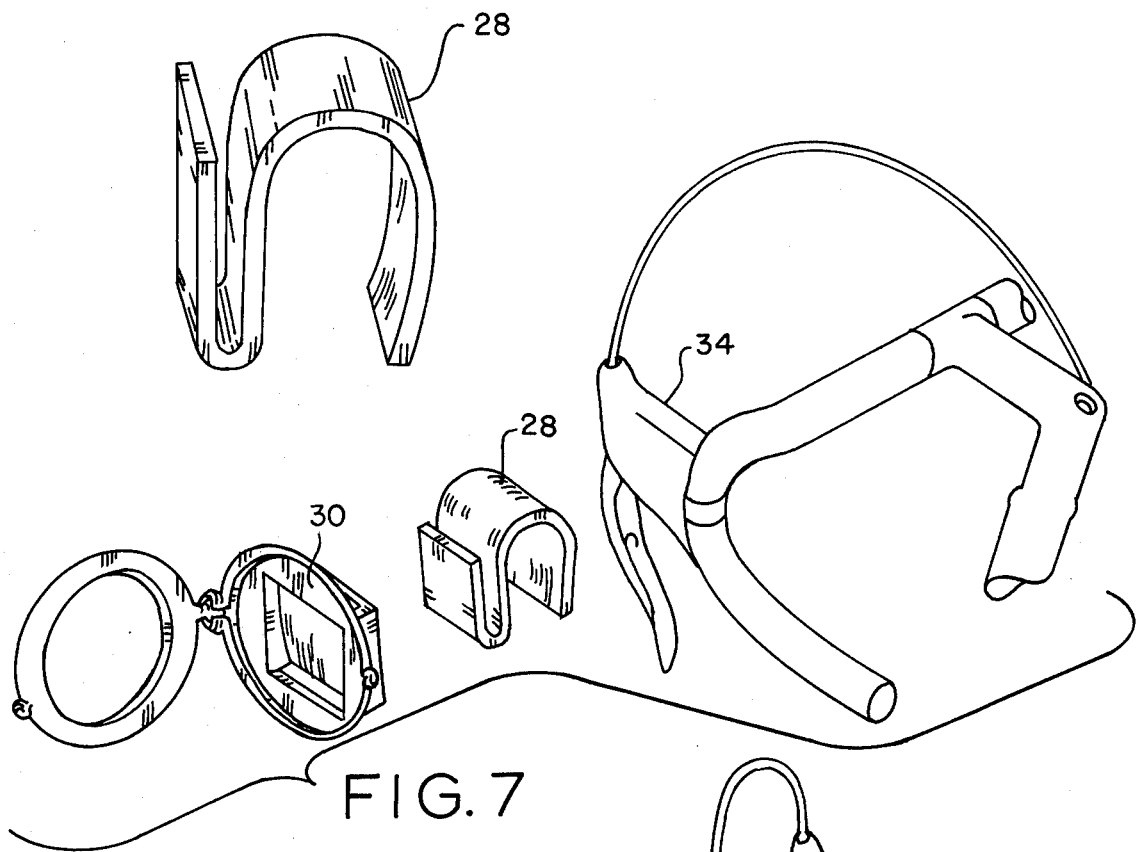
FIG. 6
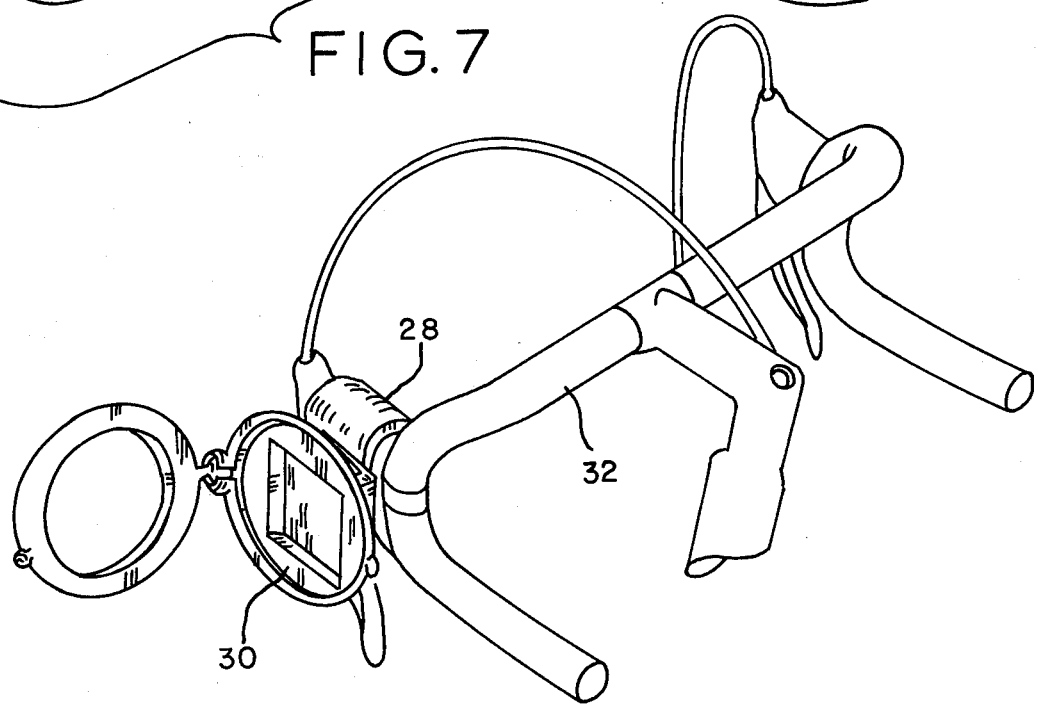
FIG. 7
FIG. 8

REAR VIEW CYCLING MIRROR

This is a continuation-in-part application of my copending application Ser. No. 677,699 filed Apr. 15, 1976 now abandoned.

BACKGROUND OF THE INVENTION

The present invention relates to a rear view mirror and, more particularly, to a rear view mirror which can be alternately worn by a cyclist or mounted on a bicycle.

A number of rear view mirrors have been developed which are worn by the user, but none of these provides the simplicity of the present invention and yet has the capability of being infinitely adjustable. Furthermore, the versatility of the present invention in being adaptable to mounting on the bicycle is unmatched in the prior art.

SUMMARY OF THE INVENTION

An impact resistant case is provided which includes a base and a cover. The mirror is secured to the inside of the cover. A hinge, connecting the cover to the base, enables the cover to be opened to a wide range of positions so that the cyclist can adjust the mirror to reflect the desired image. Means is provided to mount the device in position for use, i.e., either to the cyclist or to a structural component of the bicycle. The mounting means includes a dropped or recessed portion of the base which forms a slot or sleeve through which the strap or clip is inserted. Locking means is provided to keep the cover in the closed position when the mirror is not in use.

Accordingly, an object of the present invention is to provide a rear view cycling mirror which is infinitely adjustable. Another object is to provide a rear view mirror which can alternately be mounted to the user's wrist or to the bicycle. Yet another object is to provide a rear view cycling mirror which includes a surface to which cycling or other information may be affixed and be readily available to the user.

BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in connection with the accompanying drawings in which

FIG. 6 is a perspective view of the preferred type of clip to be used with the embodiment of FIG. 1;

FIG. 7 is an exploded view showing the mirror device, a mounting clip and a portion of a conventional bicycle handle bar; and FIG. 8 is a perspective view showing the embodiment of FIG. 1 mounted on a handle bar.

DESCRIPTION OF THE PREFERRED EMBODIMENT

Figures 1, 2:
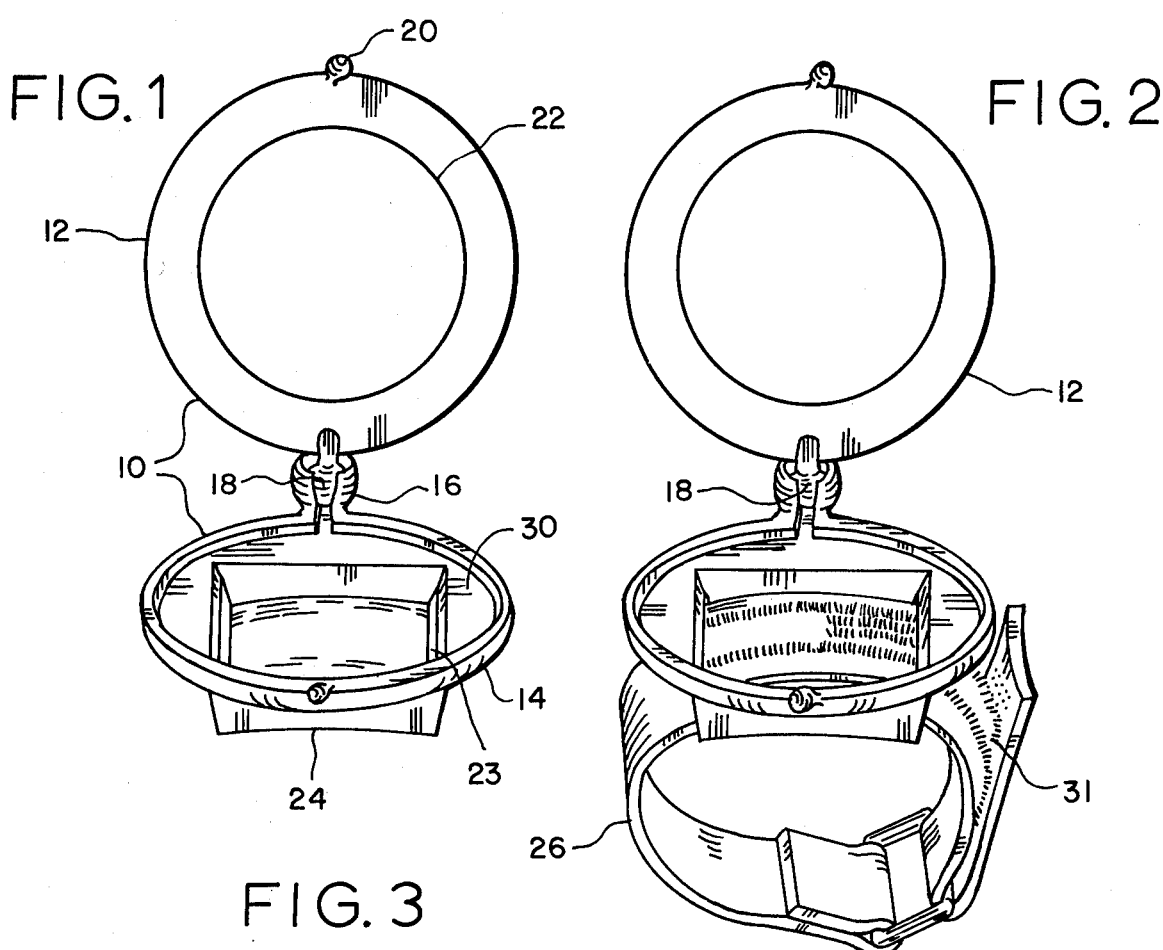
FIG. 1 is a perspective view of one embodiment of the present invention in the open position.
FIG. 2 is also a perspective view showing the embodiment of FIG. 1 with a wrist strap for mounting purposes.

Referring now to the drawings and FIGS. 1 through 5 in particular, an impact-resistant case comprising a cover 12 and a base 14 is hinged with a universal ball joint 16. A channel 18 is provided in the socket part of the joint so that the cover 12 and the base 14 are aligned when in the closed position. The base 14 includes a bottom wall 30 and an annular generally upstanding rim 15 whereas the cover 12 includes a top wall 17 and an annular generally depending rim 19. A latch means, comprising nibs 20, is positioned on both the cover 12 and the base 14 diametrically opposite the joint 16 to lock the cover 12 and base 14 in the closed position. It will be appreciated that upon closure the annular depending rims 15 and 19 engage in substantially continuous and sealed relation, thereby preventing dirt and rain from entering the case. The mirror 22 is secured to the top wall 17 of the cover 12 and may be either convex or planar. A portion of the base 14, perferably rectangular, is dropped or recessed and includes apertures 23 in each end thereof to form a slot or sleeve 24 through which either the wrist strap 26 or the clip 28 may be inserted. The slot 24 may be slightly curved to fit more comfortably the wrist of the wearer. The bottom wall 30 of the base 14 which is not dropped provides a face to which a card or sheet 36 (see FIG. 5) bearing useful cycling information may be affixed, giving such information as gear ratios which must be instantly available to be of any assistance.

Figure 3:
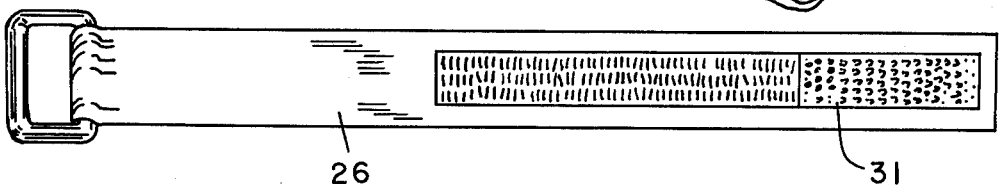
FIG. 3 shows the preferred type of wrist strap to be used with the invention.
Figure 4:
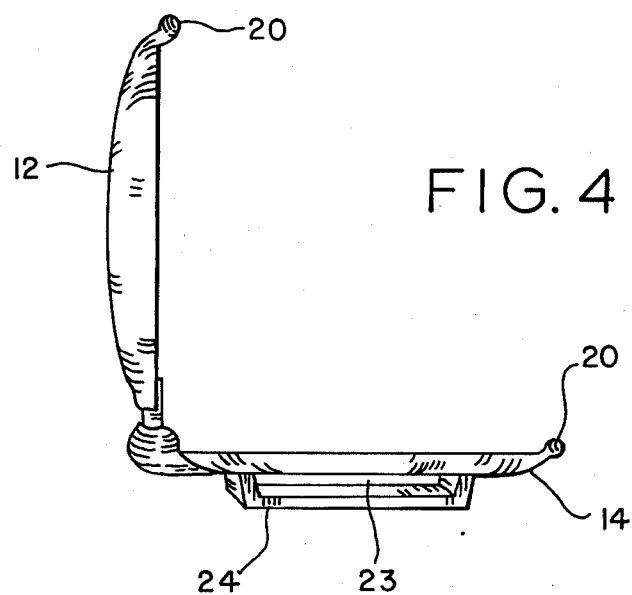
FIG. 4 is a side view of the embodiment of FIG. 1.
Figure 5:
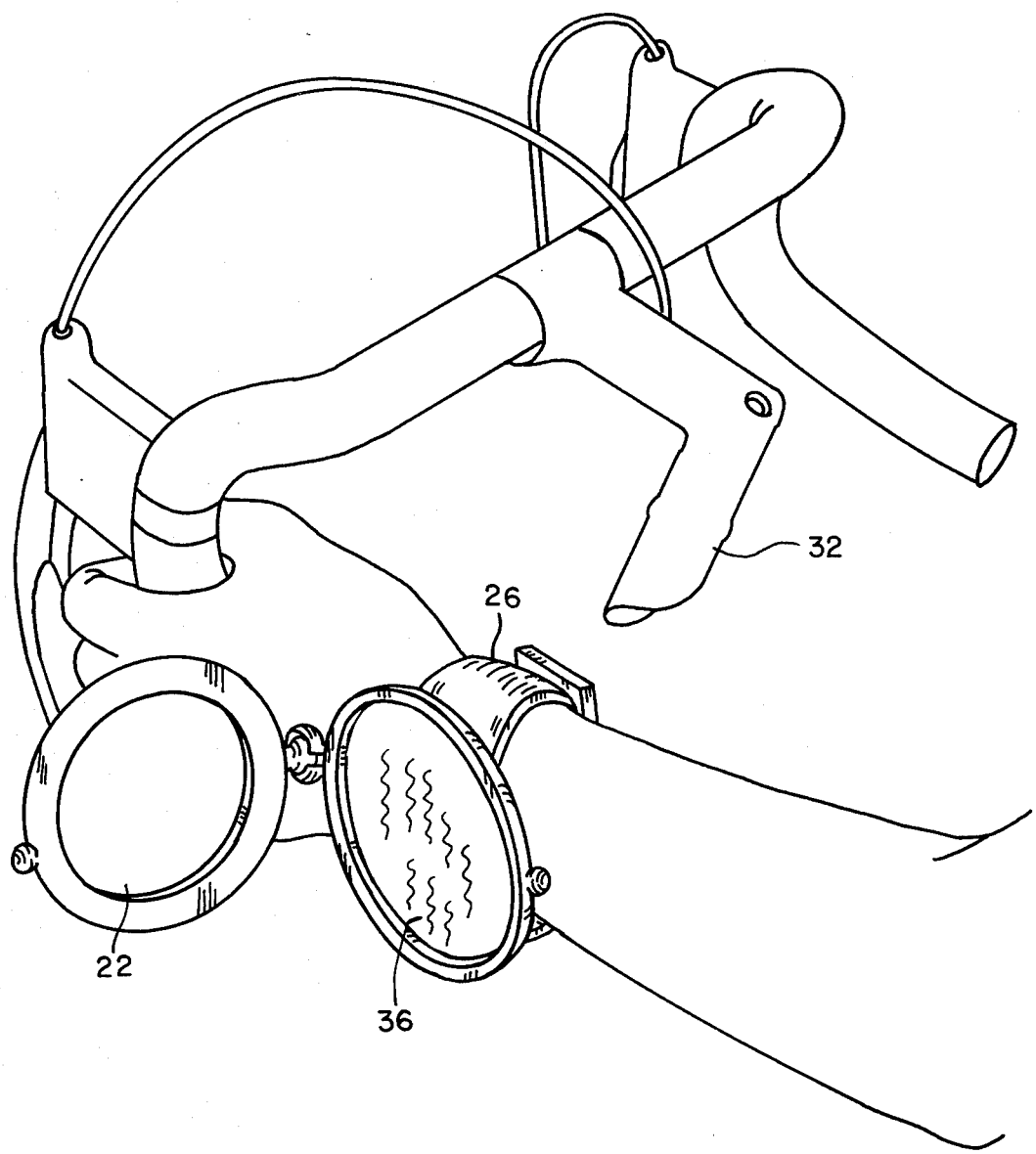
FIG. 5 is a perspective view showing the invention as worn on the wrist of a cyclist.

FIGS. 2 and 3 illustrate the preferred wrist strap 26 to be used with the invention. The strap is preferably made of rubber or plastic and is secured by material 31, known under the trademark of Velcro, affixed thereon.

FIGS. 6 through 8 illustrate the device mounted to a bicycle 32. The clip 28 comprises a generally S-shaped bar and is particularly adapted to secure the device to the brake 34 of the bicycle is a position which provides the best view through the mirror. The clip 28 includes a narrow U-shaped portion 33 and a wide U-shaped portion 35. The narrow portion 33 is dimensioned to engage the slot 24 in press fit engagement, and the wide portion 35 is dimensioned to engage the brake 34 in press fit engagement. Accordingly, it can be seen that the present invention provides a device which may be easily and expeditiously adapted to the standard and conventional bicycle at a minimum of expense.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A rear view cycling mirror comprising
    a base having a bottom wall and an annular generally upstanding rim;
    a cover having a top wall, an annular generally depending rim and mirror means mounted to the inside surface of said top wall;
    universal hinge means joining said base and said cover for moving said cover from a closed position wherein said base rim and said cover rim are in generally sealed and continuous engagement to any one of many open positions wherein an image may be reflected by said mirror means; and mounting means connected to said base to accept one of a plurality of mounting devices said mounting means comprising a dropped portion of said bottom wall, said dropped portion defining a slot for acceptance of either a wrist strap or a bicycle mounting clip.

2. The cycling mirror of claim 1 wherein said slot is dimensioned to engage said mounting clip in a press fit relationship.

3. The cycling mirror of claim 2 wherein said clip comprises a generally S-shaped bar defining a narrow U-shaped portion and a wide U-shaped portion, said narrow portion engaging said slot in said press fit relationship and said wide portion engaging said bicycle structural component in press fit relationship.

4. The cycling mirror of claim 1 wherein said bottom wall supports means for bearing reference information useful to the cyclist.

5. The cycling mirror of claim 1 wherein said base and said cover include latch means which coact to secure said cycling mirror in the closed position.

6. The cycling mirror of claim 1 wherein said universal hinge means comprises a single ball and socket joint.

7. The cycling mirror of claim 1 wherein said mirror means comprises a convex reflecting surface and said upstanding and depending rims have a sufficient dimension to accommodate said convex surface.

* * * * *